Figure 1:
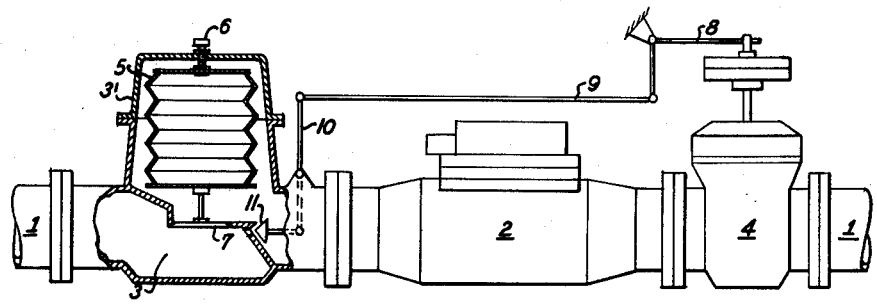

Feb. 5, 1963    H. GEHRE    3,076,337
DEVICE FOR REGULATING A FLUID METER FOR
TEMPERATURE AND PRESSURE CHANGES
Filed March 24, 1960    2 Sheets-Sheet 1

INVENTOR
HANS GEHRE

BY
ATTORNEYS

INVENTOR
HANS GEHRE

United States Patent Office

3,076,337
Patented Feb. 5, 1963

3,076,337
DEVICE FOR REGULATING A FLUID METER FOR TEMPERATURE AND PRESSURE CHANGES
Hans Gehre, 63 Bernhardstrasse, Oberkassel, Siegkreis, Germany
Filed Mar. 24, 1960, Ser. No. 17,276
Claims priority, application Germany Mar. 26, 1959
11 Claims. (Cl. 73—199)

The present invention relates to a method for regulating the Z-value, that, is the quotient $P/T$ of absolute pressure and absolute temperature, in the volume-measurement or metering of gaseous or vapours flowing in pipe-lines, as well as to an apparatus for carrying out this method.

In the art of gas-volume measurement or metering, means are already known which serve this purpose, that is which are intended to insure that the indication of the concerned measuring device is always a measure for the measured gas weight or the normal cubic metres measured.

In these known means, various ways are employed. One known method of operation consists, for example, in exposing a container, which is closed by means of a membrane or the like and has a comparison gas located therein, to the gas to be measured, whereby the comparison gas assumes the pressure and temperature of the gas to be measured and its volume alteration, which forms a measure for the Z-value. The stroke of the membrane base controls a throttle device provided in the inlet pipe-line to the measuring point (German Patent Specification No. 721,896). The setting and regulation of the Z-value is therefore dependent upon the rate of flow (volume/unit of time).

In another known method of operation, the closed limb of a U-tube serves as the comparison gas vessel (Z-value senser), which by means of a closure fluid (e.g. mercury) is closed off from the exterior space and is arranged in the measuring medium. The movable meniscus of the closure fluid being intended so to control the switch contact of a heating device arranged upstream in the measuring medium that the ratio of the absolute service pressure to the absolute temperature remains constant (German Patent Specification No. 704,621).

Devices which are to serve for Z-value regulation must, in order to be usable in practice, satisfy strict requirements. These include principally a calibratability within the narrowest error limits ($\pm 1\%$) and thus a high reliability in their mode of operation and, in close connection therewith, an extremely short regulation or setting time. These requirements are not fulfilled or are fulfilled only insufficiently by devices which operate according to the above-mentioned known methods. All these devices without exception require too large regulating times and consequently on the occurrence of extreme operating conditions and, often, closely following, mutually independent alterations of the quantities influencing the regulation process or initiating it, regulation to the desired value is impossible in practice. By the complexity and non-uniformity of the orders of magnitude of the determining influences, the attainment of an equilibrium state seldom occurs, although it is a prerequisite for the desired regulation. With the known devices, the requirement of a constant Z-value to be obtained for all loadings in the measuring gas can not directly be fulfilled.

With the second-mentioned known method of operation, which proceeds on the fact that, with service pressure fluctuations, the absolute temperature of the measuring gas flowing through the meter alters proportionally to the absolute service pressure, the gas must thus be tempered. For the heating, apart from the absolute service pressure, the existing rate of flow and the existing specific heat $C_p$ are decisive, that is they are influence factors which vary—(as is known from experience)—independently of one another in time and in value. Consequently, a disturbance is incorporated in the adjustment process which falsifies the Z-value setting and regulation and also communicates to the following consumption and regulation devices.

For these reasons and also since the error limits for officially recognised trade in volume correction are held very narrow, the known apparatus have not been introduced in practice. It is also disadvantageous in that the measurement becomes void and invalid on absence of heating current. Furthermore, in all known apparatus with temperature alterations, proportional pressure alterations also occur which act disadvantageously on the following measurement and control devices, heating plants and the like.

The present invention relates to a method for regulating the Z-value as well as to devices for carrying out this method, in which the disadvantages mentioned are avoided.

The present invention consists essentially in that the regulation by the Z-value senser is only taken in a volumetrically small measuring duct section (which in the limiting case consists merely of the volume meter) and in which the service state P,T lies between those for the input and the output ducts of this section, wherein this is limited on the one side by a throttle member of the Z-value senser and on the other side by a throttle device determining the rate of flow or its alteration directly or indirectly via a pressure quantity.

The advantage of this mode of operation consists in that the regulation restricted to such a small pipe-line section also requires a reduced volume input or output and hence also a reduced time interval for regulation of and setting in the Z-value than in regulation of a whole pipe-line network. (Industrial plants, communal undertakings and so on).

In a further development of the method according to the invention, the regulating throttle for the Z-value regulation can be influenced simultaneously by means of a regulator operating independently on the rate of flow (valve, stop-cock, one-way valve, pressure, quantity or other regulator), i.e. apart from the regulating function to be carried out by this, either in conjunction with the Z-value senser or independently thereof or by controlling a throttle opening (channel or the like) connected in parallel with this regulating throttle.

A further feature of the method according to the invention is given by association of the means which make the process of the Z-value regulation independent on the rate of flow, e.g. a power switch (servo-motor, motor, piston or the like) which actuates a throttle device arranged at the input or (and) output side of the measuring pipeline section to be regulated and is controlled in turn directly or indirectly by a measuring device responsive to the Z-value in the pipe-line section to be regulated.

A further possibility of perfection consists in using the senser for the Z-value regulator simultaneously as control means for a variable transmission provided in the counting mechanism drive of the measuring point. In this way it is obtained that state and flow rate fluctuations which occur more rapidly than corresponds to the setting time of the Z-value regulator exert practically no influence on the normal cubic metre indication of the counting mechanism.

The method according to the invention, as well as some of its practical embodiments, is described in more detail below with reference to the drawings, in all figures, the same or correspondingly constructed parts are indicated by the same references.

The invention will be more completely understood by reference to the following description of preferred embodiments illustrated in the diagrammatic drawing which includes:

FIGURE 1, an arrangement in which the throttle means is jointly controlled by the remotely positioned pressure reducing valve and the senser.

Figure 2:
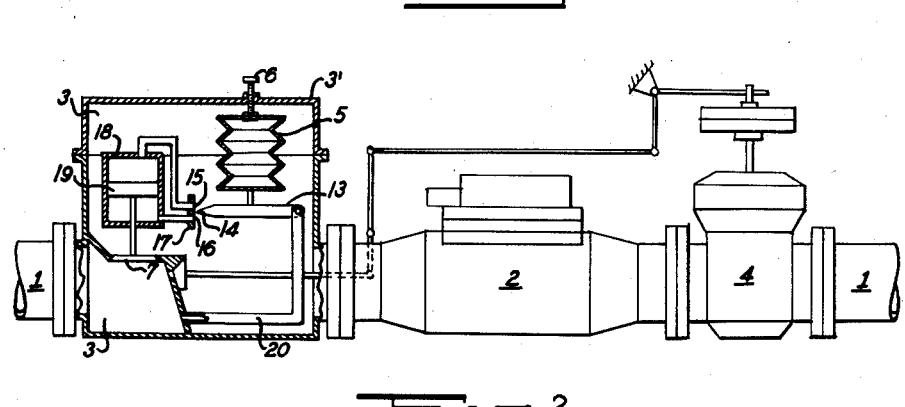

FIGURE 2, an arrangement similar to that of FIG. 1 in which is provided a sensitive valve actuated mechanism controlled by the senser.

Figure 3:
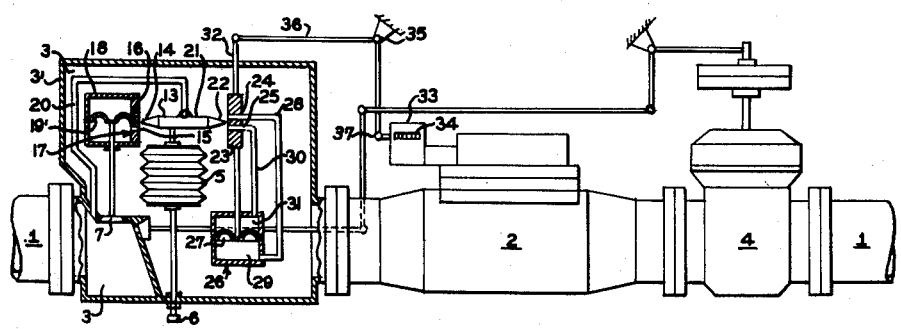

FIGURE 3, a modification similar to that of FIG. 2 in which the operation of the senser influences the operation of the meter as well as the throttle means.

Figure 4:
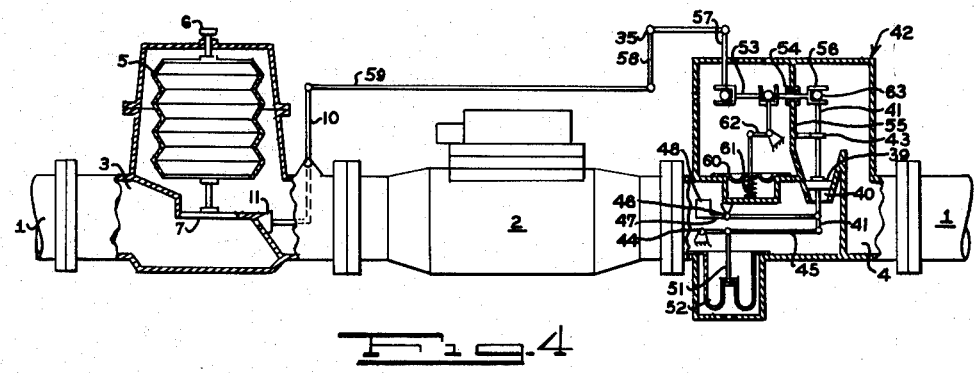

FIGURE 4, a modification of the apparatus as applied to a flow type reducing valve.

Figure 6:
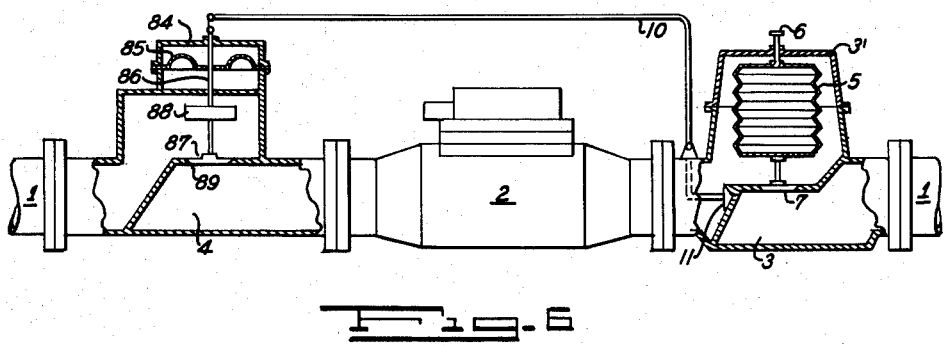
Figure 5:
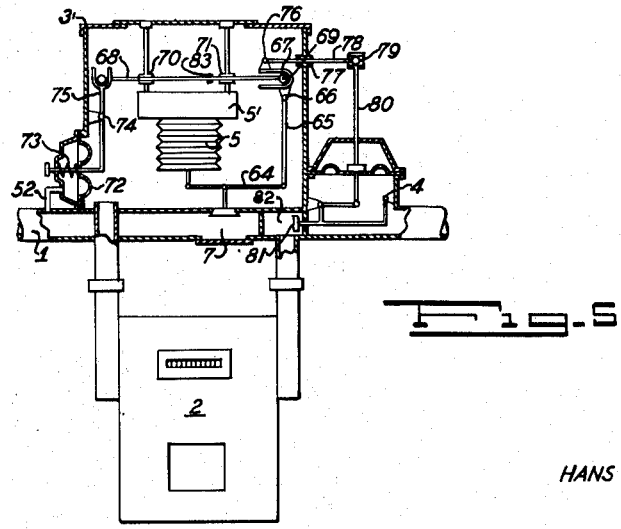

FIGURE 5, a modification in which the pressure reducing valve cooperates with a device operated by the pipe line pressure to modify the action of the senser; and FIGURE 6, an embodiment in which the positioning of the reducing valve and the throttle valve are reversed as compared with the previously mentioned arrangements.

Referring firstly to FIG. 1, the measuring pipe-line is indicated at 1, in which the meter 2 is installed. The Z-value regulating throttle valve means 3 is inserted before it and a pressure regulator 4 of any suitable known construction is inserted after it in the direction of flow. Between the regulating valve 3 and the pressure regulator 4 lies the section of the measuring pipe line to be regulated, which here is represented for example by the gas meter 2. The Z-value regulator 3 consists of a housing 3' in which an elastic vessel 5 with a very small inherent elasticity (corrugated tube or bellows or the like) is disposed. A comparison gas is enclosed in the vessel 5. The volume of this comparison gas assumes the pressure and temperature of the surrounding gas to be measured and its magnitude is thus a measure for the Z-value. Whereas the upper end plate of the vessel 5 is held by a screw 6, which also serves as a regulating means, the lower, movable end plate forms the drive means of a main throttle valve 7.

The pressure regulator 4 ensures that a substantially constant pressure is maintained in the outlet pipe-line. A greater or lesser flow cross-section is thus made available in accordance with the rate of flow and in this way transiently influences the Z-value of the measuring gas in the meter 2. With decreasing rate of flow, the regulator valve 4 is throttled and the flow through the meter 2 is restricted so that the Z-value thus becomes greater and the elastic vessel 5 is compressed. The cross-section of the throttle valve 7, i.e. the inlet opening to the meter 2, is thus decreased, so that a further increase of the Z-value in the meter 2 cannot occur. With increasing rate of flow, the reverse process occurs, i.e. the elastic vessel 5 expands and increases the flow cross-section at the throttle valve 7. In this way, a further fall in the Z-value in the meter 2 is prevented.

This controlling movement involves a dependence of the actual Z-value within the meter 2 on the existing rate of flow, since any volume alteration of the vessel 5 implies a Z-value alteration. In order to maintain this dependence within allowable limits, the space within the elastic vessel 5 or its effective volume can be enlarged by connecting it to a rigid container such as is described later herein (see FIG. 5). This ensures that already with small Z-value alterations a greater adjusting stroke of the throttle 7 is attained and the sensitiveness of the Z-value regulation is increased. In other words, under these conditions, it becomes possible for the Z-value in the measuring section (meter 2) to move within the prescribed error limits, if this section is kept sufficiently small.

With outlet side setting of the gas consumption in any case of flow rate alteration firstly the pressure regulator 4 will respond and if the pressure has fallen somewhat within the meter 2 (the Z-value thus becoming smaller), the elastic vessel 5 only then enters into action and regulates the valve 7. The setting of the valve 7 consequently occurs later than setting of the pressure regulator 4. This time difference is dependent on the volume content of the measuring pipe-line section to be regulated to a predetermined Z-value (here namely the meter 2) and the smaller this section becomes, so the quicker and more complete is the regulating process.

It is to be noted that too long regulating times act quite deleteriously, if the rate of flow in the regulating devices 3 and 4 alters in short time intervals, as is often the case. Hence, apart from the reduction of the measuring section (meter 2) and to further shortening of this time loss, the pressure regulator 4 serves by way of a link 8, 9, 10, to actuate an auxiliary valve 11 connected in parallel with the throttle valve 7 and forming part of the throttle valve means, through which an additional quantity of gas flows to the section to be regulated (meter 2). The setting of this auxiliary throttle 11 is a function of the regulator setting, so that with the pressure regulator 4 wide open, the throttle 11 is also wide open. Gas thus flows through the throttle valve 7 and also through the auxiliary throttle 11 to the measuring section to be regulated. On movement of the pressure regulator 4 in the closing sense, the reverse process occurs. By this means, the regulating time of the system is reduced to a minimum.

In the case where the gas state at the outlet connection of the meter is to be employed, the elastic vessel 5 can naturally be installed at the outlet of the measuring section, whereas the associated throttle valve 7, as in FIG. 1, remains associated in front of the meter and the movement of the lower end plate of the vessel 5 is transmitted in suitable manner, e.g. by means of a mechanical link.

FIG. 2 shows an embodiment of the device in which the Z-value prevailing in the measuring section (meter 2) and thus the expansion of the vessel 5 is no longer dependent upon the rate of flow, whereas the flow cross-section of the throttle valve 7 is still adapted to it. The movable end plate of the elastic vessel 5 tilts a jet tube 13 whose nozzle 14 is shifted relative to a rigid plate 17 provided with openings 15 and 16. The openings 15 and 16 are each connected by a tube within opposite ends of a cylinder 18. A control piston 19 moves in this cylinder and is rigidly connected with the throttle valve 7. Gas at high pressure from the inlet pipe-line, if required through the intermediary of a filter (not shown), is passed through a pipe-line 20 to the tube 13 at its pivot point. The two openings 15 and 16 in the plate 17 are shown separated from one another on account of simplicity. In practice, they lie so closely together that with the least pivoting of the tube 13 by means of the base plate of the vessel 5 the jet tube nozzle 14 blows into one or the other of the openings, since a pressure difference exists between the inlet connection 1 and the internal space of the housing 3' of the Z-value regulator.

If the Z-value has increased and consequently the nozzle 14 faces the opening 15, an increased pressure is produced above the piston 19 and the piston 19 moves downwardly, whereby the valve 7 becomes closed. If with decreasing Z-value, the jet tube is pivoted downwardly until its nozzle 14 faces the opening 16, then the over-pressure appears under the piston 19 and this moves upwardly, whereby the throttle valve 7 is opened.

If a predetermined Z-value (desired value) is prescribed in the section to be regulated (meter space 2), with the narrowest deviation from this value, the elastic vessel is compressed or expanded and the nozzle 14 is pivoted towards the opening 15 or the opening 16 and immediately the piston 19 and hence the throttle valve 7 react, until on attaining the desired Z-value the movable end plate of the elastic vessel 5 and hence the tube 13 are returned to their starting positions, in which the nozzle 14 is again located exactly in the middle between the openings 15 and 16, so that the desired Z-value is again restored. The piston 19 comes to rest at this instant and the positions of the piston and the throttle valve 7 are then adapted to the new rate of flow. The function of the pressure regulator 4 inserted after the meter is the same as in FIG. 1. All embodiments, modifications and improvements described in connection therewith are applicable mutatis mutandis in the construction according to FIG. 2.

In order to shut off the gas stream through the duct 20 at the moment of closure of the regulating valve 7, a closure member can be provided which is driven by the movement of the jet tube 13, as soon as the tube nozzle swings above the upper opening 15. This closure member can be formed for example by the pivot point of the jet tube 13, which is constructed for this purpose as a stop cock or the like.

A further embodiment is shown in FIG. 3. For reasons of clarity of the illustration, the elastic vessel 5 is shown disdisposed below the pivoted jet tube 13 associated with it. The references to the openings 15 and 16 in the plate 17 are exchanged, as compared with the arrangement in FIG. 2, since the elastic vessel 5 pivots the jet tube 13 in the contrary sense to that in FIG. 2. Instead of the control piston 19, a membrane 19' is inserted, which actuates the throttle valve 7 and opens it in its downward movement and throttles it in its upward movement, namely in the converse opening and closing senses as compared with the arrangement according to FIG. 2.

Likewise together with the jet tube 13 and at the same time pivotably by the elastic vessel 5, a flow tube 21 is arranged, which is supplied via the pipe-line 20 and has a nozzle 22 on its rigid end. The jet tube 21 co-operates with a movably arranged plate 23 in which openings 24 and 25 are provided. The plate 23 is connected with the shaft of a membrane 27 associated with a control housing 26. Its opening 24 is connected by a flexible pipeline 28 to the space 29 beneath the membrane 27 and the opening 25 is connected by a corresponding pipe-line 30 to the space 31 above the membrane 27. Above, the plate 23 is guided in the housing 3' by a rod 32.

According to the yielding of the vessel 5, the nozzle 22 approaches the opening 24 or the opening 25 in the plate 23. The openings of these two channels must again be closely arranged with respect to one another, so that the smallest shifting of the jet tube tip 22, which in the equilibrium state directs the gas flowing in it in the same proportion into the two openings, (dynamic pressure uniformity in the two channels), favours one or other of them as to introduction of gas and thus imparts the greater dynamic pressure to it.

If the Z-value decreases in the measuring section (meter 2) e.g. with reduction of the pressure determining it, and hence decreases at the same time in the Z-value regulator 3, the elastic vessel 5 expands and thus pivots the jet tube 13 upwardly and the jet tube 21 downwardly. The tip 14 of the tube 13 faces the channel 16 and the membrane 19' opens the throttle valve 7. The Z-value regulating process occurs completely as described with reference to FIG. 2.

As soon as the tip 14 is located in front of the channel 16, the tip 22 of the tube 21 stands in front of the channel opening 25. Because of the back pressure prevailing, an overpressure is set up above the membrane 27, which moves the membrane downwardly and with it the plate 23, until the emergent flow jet impacts both openings 24 and 25 and the system becomes equilibriated, since the same pressure prevails again on both sides of the membrane 27 and its movement and hence the movement of the plate 23 come to rest.

If the Z-value in the measuring section (meter 2) and hence inside the Z-value regulator becomes greater, then the comparison gas volume is compressed together with the yieldable vessel 5 containing it and the tips 14 and 22 of the jet tubes 13 and 21 face the openings of the channels 15 and 24. The membrane 19' makes an upward movement and the throttle valve 7 makes a movement in the closing sense. The membrane 27 likewise makes an upward movement, until the flow jet emerging from the tip 22 enters half into each of the openings 24 and 25 and the membrane 27 and the plate 23 come to rest.

From the above disclosure, it will be recognized that the position of the plate 23 always corresponds to the location of the tip 22, namely to the pivoting of the jet tube 21, and consequently is an exact measure for the Z-value. For the case where, for any reason, the Z-value regulator requires a longer setting time, the alteration of the position of the plate 23 is used to set a variable transmission drive 33 which is assumed to be located between the meter 2 and its registering mechanism 34. The transmission is effected e.g. by way of a rod 32 sealingly guided through the housing 3' and a crank lever 36 pivotally arranged at 35 on the control rod 37 of the above-mentioned transmission drive 33. The transmission is adjusted correspondingly to the ratio of the existing Z-value $Z_a$, and the desired Z-value $Z_s$, and thus corresponds to $Z_a:Z_s$.

The effect of this measure consists in that, during the regulating process, any existing deviation of the Z-value from the desired value is compensated in the measuring mechanism indication by the controlled transmission drive 33. The purpose and function of the regulating device 3 is the same as in the previously described embodiments. In general, all previously described modifications and improvements (such as the throttle 11 with its control) can be applied to the construction according to FIG. 3.

In the arrangement according to FIG. 3, both jet tubes are pivoted as a whole by means of a single elastic vessel 5. Naturally, the two tubes can be driven separately and two separate elastic vessels can be provided.

In cases in which the meter 2 is a bellows gas meter, instead of the variable transmission drive 33, some other means for variable limitation of the bellows stroke, e.g. an adjustable abutment, can be provided in the meter. The method in accordance with the invention is thus usable where the measuring section is extremely small, that is even if for example the meter 2 is a household gas meter and the measuring section represented by it is limited at one side (inlet) of an existing household pressure regulator and on the other side (outlet) by the likewise existing stopcock for the subsequent consumption devices. Thereby the existing household pressure-regulator plays the rôle of a Z-value pre-regulator, which approximates the gas state in the measuring section only in rough limits to the desired Z-value. Only by the simultaneous compensating effect of the device correcting the transmission 33, (sufficient as such device for example may be the bellows 5 and the already mentioned abutment limiting the membrane stroke in the meter), the desired Z-value is thus considered by the measuring mechanism of the meter.

The embodiment according to FIG. 4 corresponds substantially with that according to FIG. 1. In place of the pressure regulator 4, a volume meter comprising a float meter 39, 40 of usual construction is provided, which controls the rate of flow to a constant back-pressure. The float 39 consequently has the form of a plate. By a guide shaft 41 it is guided co-axially to the tube axis of the funnel-shaped passageway 40 usual in float meters. The housing is indicated at 42. The shaft 41 is guided at 43 and on its lower end is pivotally connected to a lever 45 pivotable about a pivot point 44. Also, a double lever 47 pivotally mounted at 46 engages the shaft 41 and at its opposite end carries a weight 48.

The float 39 is loaded downwardly, i.e. contrary to the flow direction of the gas, by the force of a rolled membrance 50, which force is transmitted to the lever 45 by means of the shaft 51. On this membrane 50 acts the over pressure (gauge pressure) in the measuring duct section (meter 2). The size of this membrane and the transmission to the lever 45 are so arranged that their loading on the float 39 equals the product of the surface of the float and the gauge pressure loading the rolled membrane 50. A further load on the float 39 is formed by its own weight, which is equal to the product of the desired constant pressure drop $\Delta_p$ at the float 39 and the float surface $f$. Finally, its load includes the desired constant back pressure $p_h$ (gauge pressure) corresponding to a load force $p_h f$.

The weight 48 opposes these loading forces and is so dimensioned that its effective force on the float 39 is equal to $(\Delta_p + p_h)f$. In other words, the float 39 moves until, by alteration of the flow cross section at 40, the back pressure $p_h$ has attained its desired value. Since the position of the float 39 is no longer a decisive measure for the rate of flow, because of the load distribution mentioned, a pressure dependent transmission, which is actuated on its part by the guide shaft 41, is provided for controlling the auxiliary valve 11, whose cross-section should be dependent on the rate of flow of the measuring medium.

A longitudinally movably arranged rod 53 forms the drive of the valve 11 and is sealingly passed at 54 through the partition wall 55 and is pivotable about the inlet point itself. This rod projects with a ball tip provided upon it into a fork 56 of the guide shaft 41 and with its other end transmits its pivotal movement by way of a mechanical link 57, 58 and 59 and the shaft 10 already mentioned in FIG. 1 to the auxiliary valve 11 (or 11'). The rod 53 is shifted in its turn by a membrane 60, which is urged by the gauge pressure in the measuring section (meter 2) against a compression spring 61 and hence actuates a crank lever 62 and this occurs in accordance with the size of the gauge pressure in the measuring section 2. Consequently, the ball tip 63 of the rod 53 always extends closer to the pivot point 54, so that with equal shifting of the guide shaft 41 the stroke of the shaft 53 and thus that of the crank lever 57 is correspondingly enlarged. If the gauge pressure in the measuring section decreases, this stroke becomes smaller. The movement of the crank lever 57 is transmitted either directly or if required by way of a correcting pair of roller levers (not shown) to the lever 10 (or 10'). The function of the auxiliary valve 11 corresponds to that in FIG. 1. The Z-value regulator 3 with its valve 7 likewise corresponds in construction and operation to the explanation given above in connection with FIG. 1.

In all embodiments described herein, mechanical transmission means have been used. It is clear however that for the same purpose, hydraulic, electrical and optical transmissions can also be used. These modifications do not require any separate diagrammatic illustration.

In FIG. 5, an embodiment with a pressure regulator is again shown, in which this regulator 4, which is here indicated in diagrammatic section, together with the elastic vessel 5 (whose operative space is enlarged in the manner already described by a connected chamber 5'), controls the throttle valve 7. It is to be specially noted that the gas quantity flowing through the throttle valve 7 follows a pressure decrease effective on this valve. As described in the following in more detail, the adjusting influence of the pressure regulator 4 upon the throttle valve 7 is made dependent upon this pressure decrease.

The yieldable vessel 5 is rigidly located within the housing 3' and its movable base plate is connected with its one end to a lever 64, the other end of which is pivoted to a connecting rod 65 and this is joined at 66 to a fork 67. A rod 68 engages in this fork with a ball tip 69 secured to it. The rod 68 is axially guided in bearings 70 and 71. A membrane 72, which on the one side, by way of a duct 52, is subject to the pressure prevailing in the pipe-line 1 and on the other side to the pressure prevailing in the housing 3', transmits its force to the tension spring 73 and its movement is transmitted to the rod 68 by way of the double lever 75 pivotally mounted at 74. The position of the ball tip 69 is thus a function of the pressure difference effective on the membrane 72, which as previously mentioned corresponds in turn to that on the valve 7. The fork 67 includes a nose-piece 76 to which a lever 78 pivotally mounted in a bushing 77 is connected, its other end 79 being positioned by the guide shaft 80 of the pressure regulator 4.

The ball tip 69 forms the pivot point of the fork 67, so that on its movement to the left the spacing of the link point 67 from the pivot point 69 becomes greater. This distance is decisive for the magnitude of the stroke transmitted by the shaft 80 of the pressure regulator 4 to the lever 64. With large Z-values, i.e. with a smaller pressure drop at the membrane 72, the spring force of the tension spring 73 is prevalent, so that the pivot point 69 moves to the right, whereby it approaches the pivot point 66. In closure movement of the pressure regulator 4, the pressure in the housing 3' increases until the valve 7 closes. Thus the effective pressure difference on the membrane 72 attains a minimum and the tension spring 73 moves the shaft 78 and hence the ball tip 69 as far to the right as is permitted by an abutment 83 on the shaft 68. Preferably, the location or setting of this abutment is so arranged that on contact the pivot point 69 lies approximately over the pivot point 66, since then the closure operations and also the produced setting forces of the regulators 3 and 4 do not disturb each other. The reaction force of the Z-value senser 5, on closure of the valve 7, cannot act on the fork 67, because of the superposition of the pivot points 69 and 66 and therefore not on the guide shaft 80 of the pressure regulator 4, and conversely the closing force of the pressure regulator then cannot operate on the shaft 64 of the Z-value regulator 3. The throttle valve of the pressure regulator 4 is indicated at 81 and its constructional details are of the usual kind and are not relevant to the present invention.

With small Z-values, the effective pressure difference on the membrane 72 is greater, so that its setting force exceeds the force of the tension spring 73. This has the result that the shaft 68 is shifted somewhat to the left and the guide shaft of the pressure regulator 4, with decreasing back-pressure, raises the nose-piece 76 of the fork 67 by means of the lever 78 and the pivot point 66 of the fork is thus moved downwardly, so that the valve 7 is opened. This same movement of the valve 7 is effected with decreasing Z-values by the correspondingly expansion of the vessel 5. By what is said above, the controlling influence of the pressure regulator 4 on the throttle valve 7 of the Z-regulator is clearly shown. The internal space of the regulating device 3 forms together with the bellows gas meter 2 and the closure chamber 82 the measuring space section 2 in which the Z-value is to be regulated. The arrows give the flow directions.

It has previously been assumed that the rate of flow is determined on the part of the consumer at the outlet part of the measuring duct 1. In the following construction (FIG. 6), a case is considered in which the rate of flow is set anywhere in the inlet part of the measuring duct 1, namely before the Z-value regulation.

In this case, instead of a normal pressure-regulator 4, an overpressure regulator, i.e. is a kind of safety valve, is used, which is arranged in the inlet to the measuring section (meter 2) and whose purpose is to hold constant the gauge pressure in the duct 1 by regulation of the gas in flow to the measuring section, whereas the Z-value regulator 3 now connected after the measuring section is to give a constant desired Z-value in the measuring section.

The housing of the overpressure regulator 4 consists of a chamber 84 with a membrane 85 whose guide shaft 86 is guided out through the housing wall with a sufficient play. At its lower end, the guide shaft 86 carries a valve member 87 and a loading by a weight 88 which tends to close the flow cross-section at 89 by lowering the valve member 87. With stationary flow, the downwardly-directed force of the membrane 85 holds the weight 88 in balance and the valve member 87 floats, so that a flow cross-section is available at 89, which allows the flow to pass at the gas pressure in the duct governed by the weight 88 and the size of the membrane 85, to the measuring section (meter 2). If the rate of flow alters, the setting of the valve member 87 (with constant gas pressure in the pipelines 1 as before) alters correspondingly until the flow cross-section at 89 becomes adapted to the new rate of flow.

The size of this cross-section with the gas pressure in the inlet duct 1 held constant by the system 85, 87, 88, is thus a function of the rate of flow. The regulator 4 is thus an inlet-pressure regulator. From it, the gas passes into the measuring section given by the meter 2 and flows from there into the Z-value regulator 3, which has the purpose of regulating the gas flow discharging to the outlet portion of the measuring duct 1 so that the Z-value in the measuring section remains constant.

In contrast to the embodiment according to FIG. 1, the throttle 7 here opens with increasing Z-value in the measuring section (compression of the vessel 5) and is closed with lowering Z-value. The gas quantity flowing into the outlet part of the measuring duct 1 is thus variable with constant Z-value. Since as in the embodiment described with reference to FIG. 1 there is certain dependence of the Z-value upon the rate of flow, the same measures can be used for limiting the Z-value alterations as are described in connection with FIG. 1. For example, the auxiliary valve 11 can be set by the guide shaft 86 by way of the associated cranked lever 10.

In the description of the various embodiments, the Z-value senser has been described as an elastic comparison gas vessel, as is customary in prior volume correcting devices. This was done, however only on account of diagrammatic simplicity. Obviously, any other kind of Z-value senser, in particular, one without comparison gas, can be employed to control the valve 7, such as for example the known recent constructions in which the influence quantities (pressure, temperature, barometric state) are converted by a computing device, e.g. a quotient former, into an equivalent geometrical setting quantity proportional to the Z-value.

What I claim is:

1. Apparatus for controlling the specific gravity of gases or vapors flowing in a measuring pipeline which includes a senser device responsive to the quotient of absolute pressure divided by absolute temperature of the gas to be measured, throttle valve means in said pipeline controlled by said senser device, a pressure regulator means maintaining the gas pressure at a predetermined discharge value, a volume recording meter in said pipeline interposed between said throttle valve means and said pressure regulator valve, and means controlled by the pressure regulator to actuate said throttle valve means in cooperation with said senser device to regulate the gas flow to said meter in accordance with variations of the flow through said pressure regulator.

2. Apparatus for measuring volumes of gas flowing at variable rates in a pipe line and for correcting such measurements in terms of predetermined standard pressure and temperature values, which includes a pressure and temperature responsive senser, throttle valve means in said line controlled thereby, and a valve for reducing the gas pressure to a predetermined discharge value, a volume recording meter in said pipe line interposed between said throttle valve means and said pressure reducing valve and means controlled by the pressure reducing valve to actuate said throttle valve means in cooperation with said senser to regulate the flow of gas to said meter in accordance with variations in flow through the said reducing valve.

3. Apparatus as set forth in claim 2 in which said pressure reducing valve control means includes a link connection actuated by motion of the reducing valve.

4. Apparatus as set forth in claim 2 in which said throttle valve means includes a main throttle valve operated by said senser, a passage by-passing said main throttle valve, and an additional valve controlling said passage and actuated by said reducing valve.

5. Apparatus as set forth in claim 2 in which said throttle valve means includes a pressure actuated member and in which said senser is adapted to direct pressure fluid to said member.

6. Apparatus as set forth in claim 2 which means is provided to bias said throttle valve means as to its degree of opening.

7. Apparatus as set forth in claim 6 in which said biasing means mechanically controls said meter.

8. Apparatus as set forth in claim 2 in which the pressure reducing valve is provided with a floating valve member actuated by the flow of fluid passing therearound.

9. Apparatus as set forth in claim 2 in which is provided means actuated by the inlet pressure in the pipe line coacting with the pressure reducing valve controlled means to vary the operation of said throttle valve means.

10. Apparatus as set forth in claim 2 in which said pressure reducing valve is positioned in said pipe line preceeding said meter and said throttle valve means is subsequent to the meter in the direction of fluid flow.

11. Device for the automatic regulation of the specific weight of gases or vapors which flow through a volume meter and a pressure regulator positioned in a line with a temperature pressure senser positioned close to the meter responding to the quotient $Z=P/T$ between absolute pressure and absolute temperature of the measuring gas, and a valve controlled by said senser, wherein the measuring section is throttled on the one side by said valve and on the other side through the throttle-cross section of said pressure regulator, which responds to pressure fluctuations outside of the measuring section, thus characterized, that the pressure additionally measured by the pressure-regulator controls the aforementioned senser for the regulation of the specific weight (Z-value-regulator).

References Cited in the file of this patent
UNITED STATES PATENTS

| | | |
|---|---|---|
| 2,100,978 | Rheinlander | Nov. 30, 1937 |
| 2,826,214 | Volker | Mar. 11, 1958 |